Dec. 1, 1925.
J. C. TAYLOR
1,563,939
TESTING AND TRUING DEVICE
Filed Aug. 4, 1924     2 Sheets-Sheet 1
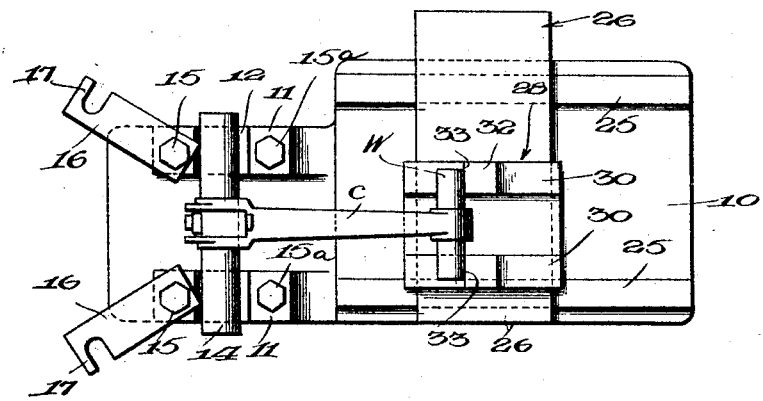
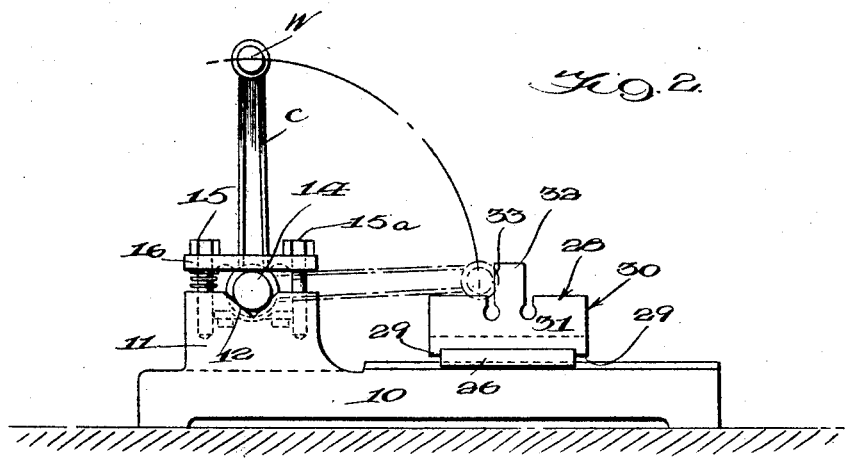
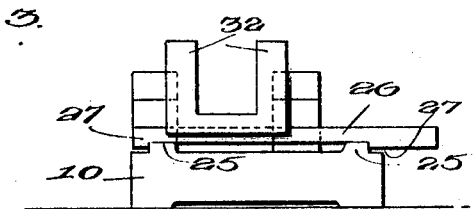
INVENTOR
J. C. TAYLOR,
BY
ATTORNEYS Dec. 1, 1925.
J. C. TAYLOR
1,563,939
TESTING AND TRUING DEVICE
Filed Aug. 4, 1924
2 Sheets-Sheet 2
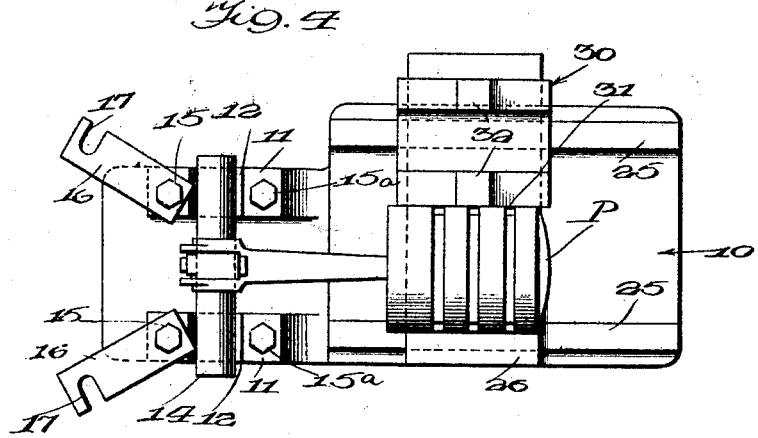
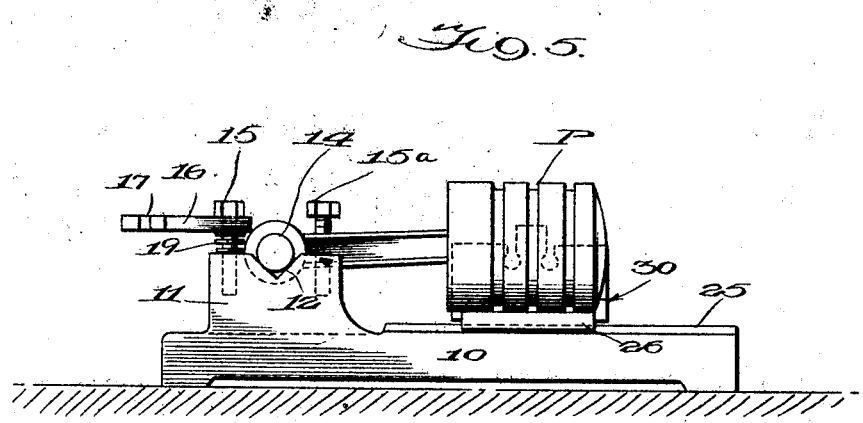
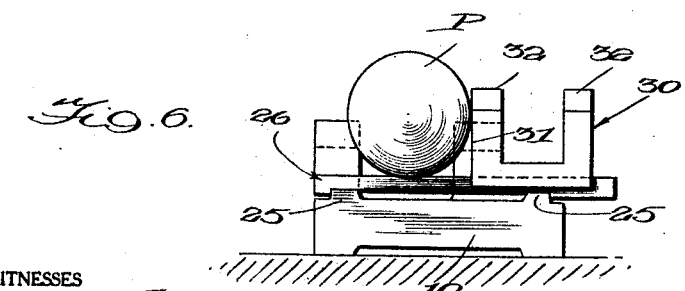

Patented Dec. 1, 1925.

1,563,939

UNITED STATES PATENT OFFICE.

JOHN COOPER TAYLOR, OF HERMANSVILLE, MICHIGAN.

TESTING AND TRUING DEVICE.

Application filed August 4, 1924. Serial No. 730,049.

*To all whom it may concern:*

Be it known that I, JOHN C. TAYLOR, a citizen of the United States, residing at Hermansville, in the county of Menominee, State of Michigan, have invented certain new and useful Improvements in Testing and Truing Devices, of which the following is a specification.

This invention relates in general to testing and truing devices for use with engine and machine parts and is especially designed for testing and truing the connecting rods or pistons of the engines of motor vehicles such as automobiles or the like.

The present application is a continuation in part of my prior application for testing and truing devices filed December 4, 1922, Serial No. 604,840, now Patent No. 1,507,633, granted September 9, 1924.

The object of the invention is to provide a device of this character which may be easily and quickly manipulated for the dual purpose of testing and straightening the connecting rod of an engine as well as the connection between the connecting rod and the piston so that the piston may be properly positioned and aligned on the connecting rod.

A further object is to provide a device of this character and having these advantages and capacities and which is also of such simple and sturdy construction as to maintain its accuracy and precision even when subjected to the rough usage met with in actual practice.

Other objects and advantages reside in the certain novel features of the construction, arrangement and combination of parts which will be hereinafter more fully described and particularly pointed out in the appended claims, reference being had to the accompanying drawings forming a part of this specification, and in which:

Figure 1 is a plan view of one embodiment of the invention showing the same in use and in testing a connecting rod, Figure 2 is a view in side elevation of the arrangement shown in Figure 1, the connecting rod being shown in position for straightening, Figure 3 is a view in end elevation looking to the right of Figures 1 and 2 with the connecting rod removed, Figure 4 is a plan view of the device showing the same in use when testing the connection between the piston and the connecting rod, Figure 5 is a view in side elevation of the arrangement shown in Figure 4, and Figure 6 is a view in end elevation looking toward the right of Figures 4 and 5.

Referring to the drawings the numeral 10 designates a base having a pair of bearing blocks 11 at one end. The bearing blocks 11 are exactly opposite each other, one bearing block being located on one side of the base and the other bearing block being located on the other side of the base. V-shaped seats 12 are provided in the tops of the bearing blocks 11 and are designed to receive various sizes of mandrels 14 provided for the various sizes of connecting rods to be tested.

In order to hold the mandrels 14 against the seats 12 during the testing and especially during the straightening operation cap screws 15 and 15$^a$ are threaded into the top of each bearing block on each side of each seat 12. Holding bars 16 are pivotally connected to the cap screws 15 and are provided with notches 17 designed to engage or receive the cap screws 15$^a$ when the holding bands are positioned to maintain the mandrel 14 against the seats 12. A coil spring 19 encircles each cap screw 15 and engages the bearing block 11 at its lower end and the underside of the bar 16 at its upper end, whereby each bar 16 is held up against the head of its cap screw 15. By adjusting the cap screws 15 the vertical positions of the bars 16 may be varied. The cap screws 15$^a$ are received in the notches 17 and the heads of the cap screws 15$^a$ engage the ends of the holding bars at which the notches 17 are located when the holding bars are so positioned that the cap screws 15$^a$ are received in the notches 17. By tightening up the cap screws 15 and 15ᵃ the holding bars may be brought to bear against the mandrel 14 with the degree of pressure necessary to firmly hold the mandrel against the seat 12.

Guide ribs 25 are formed on the base 10 forwardly of the bearing blocks 12 and adjacent to though slightly spaced from the side edges of the base. As shown in the drawings these guide ribs 25 are disposed parallel to each other and parallel to the side edges of the base and the outer side edges of the ribs are vertical and are parallel to each other. A carriage 26 is slidably mounted on the ribs 25 and is designed to move longitudinally along the base 10. This carriage 26 is formed with depending flanges 27 which engage the outer vertical side faces of the ribs 25 to constrain the carriage to proper movement on the base.

A slide 28 is mounted on the carriage 26 for transverse movement or adjustment relatively to the base, the slide having depending flanges 29 engageable with the carriage 26 to constrain the slide to transverse movement in a direction at right angles to the movement of the carriage 26. The slide 28 constitutes the gaging or testing element of the device and for this purpose it is provided with a pair of vertical plates 30 arranged in spaced parallel relation and extending lengthwise of the machine. The outer faces of these plates 30 are designated at 31 and are machined to serve as contact faces or surfaces which directly engage and co-operate with the piston to test the connection between the piston and the connecting rod as will hereinafter more clearly appear. Gaging lugs 32 are formed on the plates 30 intermediate their ends and extend upwardly above the tops of the plates 30. These lugs 32 have contact faces 33 designed to engage the wrist pin in testing the connecting rod as will hereinafter more fully appear.

In using the device to test and straighten the connecting rod the connecting rod which is designated at C is mounted on the mandrel 14 and the mandrel 14 is positioned on the seats 12 and held thereon by the holding bars 16. The carriage 26 is then moved along the ribs 25 and the slide 28 is moved transversely across the carriage until the faces 33 of the lugs 32 are positioned to engage the wrist pin W. If both ends of the wrist pin contact with the faces 33 the connecting rod is straight and true but if either end of this pin fails to contact with the adjacent face of the adjacent lug 32 the connecting rod is distorted. The distortion may be readily corrected without removing the connecting rod from the machine by swinging the connecting rod upwardly to the position shown in full lines in Figure 2 and twisting or bending the connecting rod to such extent as may be necessary to remove or correct the distortion. Following the reshaping of the connecting rod in the manner suggested it may be again tested by being brought down to the dotted line position shown in Figure 2. By continuing the successive testing and reshaping operation until both ends of the wrist pin W contact with the faces 33 of the lugs 32 the connecting rod may be trued with accuracy and precision.

In using the device to test the connection between the piston and the connecting rod, the piston P is mounted on the connecting rod and the carriage 26 and the slide 30 are moved until the face 31 of the plate 30 contacts with one side or peripheral portion of the piston. If the complete contact is had along the entire skirt or length of the piston the connection between the piston rod and the piston is true and correct and if this connection is distorted, the character and degree of the distortion is indicated by the nature and degree of the divergence between the peripheral portion of the piston and the face 31 of the plate 32.

I claim:

1. In a testing and truing device for connecting rods, a mandrel adapted to be inserted into the crank shaft bearing end of a connecting rod, an elongated base having means for rotatably supporting the mandrel, a carriage mounted for longitudinal adjustment on the base, and a slide mounted on said carriage for movement transversely of said base.

2. In a testing and truing device for connecting rods, a mandrel adapted to be inserted in the crank shaft bearing end of a connecting rod, an elongated base having means for rotatably supporting the mandrel, a carriage mounted for longitudinal adjustment on the base, and a slide mounted on said carriage for movement transversely of said base, said slide having a pair of spaced lugs having faces co-operable with the wrist pin of the connecting rod for indicating any distortion that may have occurred in the connecting rod.

3. In a testing and truing device for connecting rods, a mandrel adapted to be inserted into the crank shaft bearing end of a connecting rod, an elongated base having a pair of bearing blocks provided with seats to receive the mandrel, cap screws mounted on the bearing blocks, holding bars pivoted to certain of said screws and having notches receiving the other screws, and springs mounted on the screws to which the bars are pivotally connected for urging said bars upwardly.

4. A testing and truing device for use in conjunction with connecting rods having mandrels mounted in the bearings thereof and comprising a base having means for rotatably supporting the mandrel, a carriage mounted for longitudinal adjustment on said base and a slide mounted for transverse adjustment on the carriage, said slide having gaging and testing means.

5. A testing and truing device for use in conjunction with a connecting rod having a mandrel mounted in its bearing and comprising a base having a pair of bearing blocks provided with seats to receive the mandrel, cap screws mounted on the bearing blocks, holding bars pivoted to certain of said screws and having notches receiving the other screws, and springs mounted on the screws to which the bars are pivotally connected for urging said bars upwardly.

JOHN COOPER TAYLOR.